Patented Aug. 21, 1945

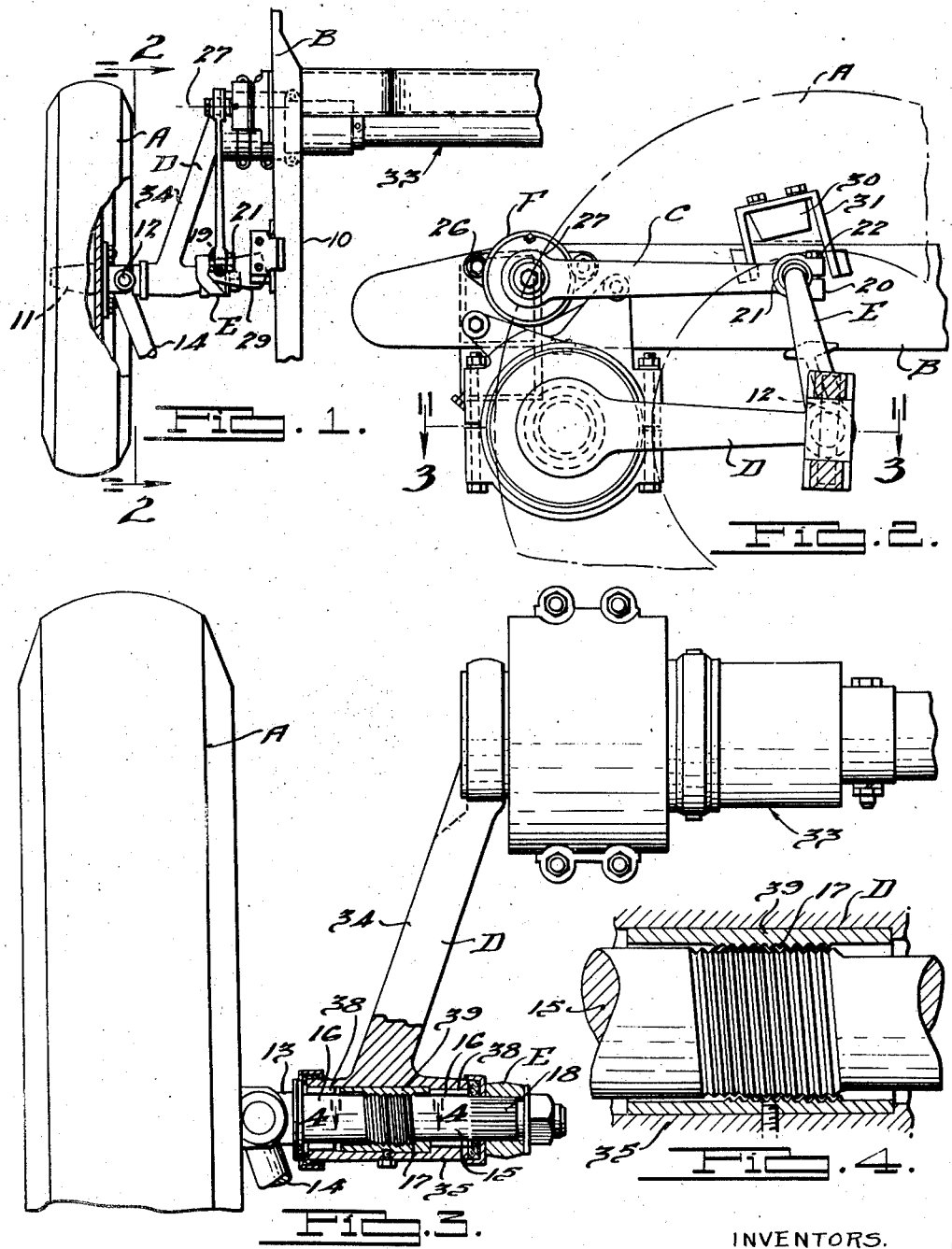

2,383,101

UNITED STATES PATENT OFFICE 2,383,101

WHEEL SUSPENSION FOR MOTOR VEHICLES

Harry T. Woolson, Detroit, Alexander G. Herreshoff, Grosse Pointe, Harold A. Hicks, Detroit, Glenn H. Parker, Royal Oak, and Raymond A. Wyatt, Detroit, Mich., assignors to Chrysler Corporation, Highland Park, Mich., a corporation of Delaware Original application November 2, 1938, Serial No. 238,422, now Patent No. 2,270,572, dated January 20, 1942. Divided and this application May 31, 1941, Serial No. 395,994

2 Claims. (Cl. 267—21)

This invention relates to motor vehicles and refers more particularly to improvements in wheel suspensions therefor, and is a division of our copending application, Serial No. 238,422, filed November 2, 1938, now Patent No. 2,270,572, issued January 20, 1942.

One object of our invention is to provide a wheel suspension of the independently sprung type affording improved riding qualities, simplification in the operating parts and substantial reduction in the cost of manufacture and assembly.

Further objects of our invention are to provide an independent wheel suspension comprising a parallelogram system of improved construction and operation and incorporating an improved arrangement for journalling an individual axle member on a parallelogram arm structure for transmission of wheel loads an axial thrusts.

In carrying out the objects of our invention we preferably provide an oscillatory wheel carrying arm structure for each of the wheels, this arm structure having a frame supported portion and a wheel carrying portion. The frame supported portion extends generally transversely of the vehicle and is connected to the frame through one or more annuli of deformable torsionally resisting material, such as rubber composition, thereby providing torsion springing units which support the frame and which yieldingly resist rising and falling movements of the associated wheels.

Additional features of our invention reside in the novel combination and arrangement of parts more particularly hereinafter described in detail and claimed, reference being had to the accompanying drawing in which:

Fig. 1 is a top plan view of a typical side portion of the front end of a motor vehicle embodying the invention.

Fig. 2 is a sectional elevational view taken as indicated by line 2—2 of Fig. 1 and illustrating a typical wheel suspension as viewed from the side of the vehicle.

Fig. 3 is an enlarged view, partly in section, taken on line 3—3 of Fig. 2 and showing one of the wheels together with its supporting arm.

Fig. 4 is an enlarged detail view of the threaded thrust bearing at an individual axle, as indicated by line 4—4 of Fig. 3.

Referring to the drawing, we have illustrated our wheel suspension system in connection with a front steerable ground wheel A which is adapted to be supported and guided for rising and falling movement independently of the remaining ground wheels of the vehicle. The vehicle frame structure B may be formed as a structural part of the body or may be in the nature of a chassis adapted to mount the body and comprises the pair of longitudinally extending channeled side members, one of which is shown at 10, for mounting the wheel supporting and guiding means.

The wheel A is rotatable in the usual manner on a spindle 11 swivelly connected for steering movements by a king pin at 12 on a king pin receiving boss 13. The spindle has a steering arm 14 for imparting steering movement to the associated wheel by any suitable type of steering mechanism.

The king pin boss 13 (Fig. 3) is carried at the outer end of an independent axle member 15 which has its axis extending inwardly as an extension of the axis of the associated spindle 11 when the ground wheel is positioned as in Fig. 1, the axle 15 therefore extending in a direction transversely of the frame structure B.

Intermediate the length of the axle member 15, the latter is formed with a pair of spaced cylindrical bearing portions 16 and a threaded portion 17 intermediate portions 16, the inner end of the axle being serrated at 18. The parallelogram system comprises upper and lower oscillating wheel carrying arm structures C and D respectively, each of these arm structures extending generally longitudinally of the vehicle and being adapted for pivotal support on the frame structure B at their forward ends. The rear ends of the arm structure C and D are pivotally connected by an upright member E which preferably extends upwardly from the arm structure D.

The upright member E has its lower end engaged with the serrations 16 of the axle member 15 so that this upright member is fixed against movement with respect to the axle member. The upright member has its upper end portion return-bent and terminates in an inwardly extending threaded shank 19 positioned generally above the lower end of the upright member. The rear end of the upper arm structure C has a yoked terminal 20 adapted to receive a bushing 21 formed with internal threads pivotally engaging the threads of shank 19. A fastener 22 extends through the yoke portions of arm C and is adapted to hold the bushing 21 in position with respect to arm C.

The forward end of arm structure C is pivotally supported by the frame structure through the intermediary of a hydraulic shock absorber F of any suitable well known "rotary type." The body portion of the shock absorber is secured by fastener 26 to the frame side member 10. The pivotal support thus formed accommodates oscillation of the arm structure C about an axis 27 which extends generally transversely of the frame structure B.

In order to limit upward movement of the wheel A relative to the frame structure B, the upright member E carries an inwardly projecting abutment 29 adapted to strike a rubber bumper 30 carried by the supporting bracket 31 which is secured to the side member 10.

Each arm structure D is shown as a build-up construction comprising an oscillatory frame supported portion generally indicated at 33 which extends generally transversely of the frame structure B. Each arm structure D is also formed with a wheel connecting portion 34 which is suitably secured to the portion 33 and which extends longitudinally of the frame structure and laterally outwardly therefrom, thus forming a cranklike portion offset rearwardly from the frame supported portion 33 and terminating in an end portion 35 which is hollow and cylindrical.

The arm structure D is adapted to take the vertical loads as well as the lateral loads acting between wheel A and frame structure B, leaving the arm structure C to function chiefly as a guide member for the axle 15 in maintaining the caster angle of the king pin 12 constant during rising and falling movement of the ground wheel A. The arm structure C also functions to take the brake thrust of the associated ground wheel, as will be readily apparent.

The cylindrical portion 35 rotatably journals the associated axle member 15 by bearings 38, preferably of the anti-friction roller type at the bearing portions 16. A thrust bearing is formed by engagement of the threads 17 with the internal threads of a bushing 39 which is suitably fixed to arm portion 35 thereby forming a structural part of the arm structure D. As best shown in Fig. 4 sufficient clearance is provided between the interengaged threads so that the threads engage for thrust transmission only when axle member 15 is subjected to axial thrust in either direction, the bearings 38 readily accommodating the slight axial movement of axle member 15 in taking up the thread clearance. Thus the vertical loads are entirely transmitted by bearings 38 and axial thrusts are transmitted through threads 17 without thrusting bearings 38. In Fig. 4 the axle member 15 is illustrated as free from end thrust in either direction, the clearance at threads 17 being divided at each side of the threads.

We have provided a suspension system wherein each arm structure D has its oscillation resisted by a torsionally acting supporting unit, each being preferably formed of a body of yielding deformable material and so arranged as to "float" the arm structure to yieldingly resist displacement thereof in directions both axially of the frame supported portion 33 as well as transversely of this axis of oscillation for the arm structure. In the present instance we have so arranged the torsion units in association with each arm structure D as to provide a high degree of stability for each wheel A thereby preventing undesired displacements of the wheel while at the same time effectively dampening shocks and vibrations which tend to produce harshness between the ground wheel and frame structure.

We do not limit our invention, in the broader aspects thereof, to any particular combination and arrangement of parts such as shown and described for illustrative purposes since various modifications will be apparent from the teachings of our invention and scope thereof as defined in the appended claims.

We claim:

1. In a motor vehicle having a frame structure and a steerable ground wheel disposed adjacent thereto, an axle structure swivelly mounting said wheel and extending inwardly therefrom in a direction transverse to the vehicle, an arm structure pivoted to the frame structure having an end portion thereof adapted to receive said axle structure, spaced bearings journalling said axle structure in said end portion and adapted to transmit thrust from said wheel to said arm structure in a direction transversely to the axis of said axle structure, said bearings accommodating limited displacement of said axle structure in the direction of its axis relative to said arm structure, said axle and arm structures having interengaged threaded portions intermediate said bearings for thrust transmission from said wheel to said arm structure in a direction axially of said axle structure, said threads engaging with axial clearance sufficient to insure loading of said bearings for thrust transmission in the first mentioned direction while accommodating thrust transmission from said wheel to said arm structure in the second mentioned direction.

2. In a motor vehicle having a frame structure and a steerable ground wheel disposed adjacent thereto, an axle structure swivelly mounting said wheel and extending inwardly therefrom in a direction transverse to the vehicle, means for supporting and guiding said axle structure from said frame structure including an arm oscillatably secured to the latter, and having a hollow portion adapted to receive said axle structure, bearing means journalling said axle structure in said hollow arm portion and adapted to transmit thrust from said wheel to said arm structure in a direction transversely to the axis of said axle structure, and a bushing in said hollow arm portion, said bushing and said axle structure having interengaged threaded portions spaced from said bearing means for thrust transmission from said wheel to said arm in a direction axially of said axle structure, said threaded portions engaging with sufficient clearance to accommodate limited axial movement of the axle structure relative to said hollow portion.

HARRY T. WOOLSON.
ALEXANDER G. HERRESHOFF.
HAROLD A. HICKS.
GLENN H. PARKER.
RAYMOND A. WYATT.